United States Patent
Myers

(10) Patent No.: US 7,614,630 B2
(45) Date of Patent: Nov. 10, 2009

(54) MOUNTING BRACKET ASSEMBLY AND SUPPLEMENTAL SUSPENSION SYSTEM

(75) Inventor: James Richard Myers, Indianapolis, IN (US)

(73) Assignee: BFS Diversified Products, LLC

( * ) Notice: Subject to any disclaimer, the term of this patent is extended or adjusted under 35 U.S.C. 154(b) by 327 days.

(21) Appl. No.: 11/493,307

(22) Filed: Jul. 26, 2006

(65) Prior Publication Data

US 2008/0023931 A1   Jan. 31, 2008

(51) Int. Cl.
*B60G 11/27* (2006.01)
(52) U.S. Cl. .................. 280/124.157; 280/124.162
(58) Field of Classification Search .......... 280/124.162, 280/124.164, 124.17, 175, 124.157
See application file for complete search history.

(56) References Cited

U.S. PATENT DOCUMENTS

| | | | |
|---|---|---|---|
| 3,913,937 A | 10/1975 | Longworth et al. | |
| 5,979,920 A | 11/1999 | Krakowiak et al. | |
| 6,796,566 B2 * | 9/2004 | VanDenberg | 280/86.5 |
| 6,899,348 B2 * | 5/2005 | Dodd | 280/86.5 |
| 6,948,726 B2 * | 9/2005 | Dodd | 280/86.5 |
| 7,380,799 B2 * | 6/2008 | Niaura et al. | 280/5.519 |
| 2005/0179176 A1 | 8/2005 | Hitt et al. | |

OTHER PUBLICATIONS

Firestone Industrial Products Installation Instructions for Supplemental Suspension Kit No. 2220.
Firestone Industrial Products Installation Instructions for Supplemental Suspension Kit No. 2330.

* cited by examiner

*Primary Examiner*—Paul N Dickson
*Assistant Examiner*—Nicole Verley
(74) *Attorney, Agent, or Firm*—Sarah M. Jabbari; Matthew Dugan

(57) ABSTRACT

A mounting bracket assembly capable of operatively engaging an associated jounce tongue of an associated vehicle suspension and supporting a supplemental air spring assembly in spaced relation to an associated sprung or unsprung mass of the associated vehicle. The mounting bracket assembly can include a first bracket supported on the associated jounce tongue and a second bracket supported on the first bracket. A supplemental suspension system can include an air spring assembly and a mounting spring assembly. A supplemental suspension system kit is also included.

9 Claims, 6 Drawing Sheets

MOUNTING BRACKET ASSEMBLY AND SUPPLEMENTAL SUSPENSION SYSTEM

BACKGROUND

The present invention broadly relates to the art of vehicle suspension systems and, more particularly, to a mounting bracket assembly and supplemental suspension system including the same.

The present invention finds particular application and use in conjunction with suspension systems of wheeled vehicles, and will be described herein with specific reference thereto. However, it is to be appreciated that the present invention is also amenable to other applications and environments, and that the specific uses shown and described herein are merely exemplary.

It is well known that land vehicles of most types and kinds are outfitted with a suspension system that supports a sprung mass (e.g., a body or chassis) of the vehicle on an unsprung mass (e.g., axles or wheel-engaging members) of the vehicle. It is also well known to use supplemental suspension springs, which are sometimes referred to in the art as "helper springs", on vehicles, such as in applications in which a vehicle will be loaded with additional equipment (e.g., a snowplow secured on the front end of a vehicle and/or a spreader supported on the back end of a vehicle). It will be appreciated that such supplemental suspension springs can be mounted on existing vehicles and/or vehicle structures in any one of a variety of ways and/or using any one of a variety of known mounting arrangements.

One disadvantage of known supplemental suspension systems, however, is that installation of the same often requires substantial disassembly of existing suspension components of the vehicle. This can, in some cases, significantly increase the time and effort involved in installing the supplemental suspension system. Additionally, this can undesirably increase the level of complexity of the installation, which could, in some cases, exceed the capability and/or comfort level of some self-installers.

What's more, some of the components that are disassembled may be discarded and replaced by new components that are supplied with the supplemental suspension system that is being installed on the vehicle. Sometimes, the new components are significantly different than the existing components. However, in many cases the new components are quite similar to the original parts and only include minor changes or modifications thereto, such as for mounting the supplemental suspension system or components thereof on the associated vehicle, for example.

Generally, it is undesirable to modify the original or existing parts, such as a field modification made by the installer at the time of installation as this can significantly increase the level of complexity and/or effort involved in the installation. As such, new components are typically included with the supplemental suspension system and the original components discarded. This, however, leads to an undesirable increase in the costs associated with the supplemental suspension system. Additionally, such arrangements also undesirably result in the discarding of otherwise usable parts and/or components.

As such, it is believed desirable to develop a mounting bracket assembly, and supplemental suspension system using the same, that is easier to install, that improves the usage of existing vehicle components, and that overcomes the foregoing and other disadvantages of known arrangements.

BRIEF DESCRIPTION

One exemplary embodiment of a mounting bracket assembly for securing an associated air spring assembly on an associated jounce tongue of an associated vehicle suspension and in spaced relation to at least one of an associated sprung mass or an associated unsprung mass of an associated vehicle is provided. The mounting bracket assembly includes a first bracket and a second bracket. The first bracket includes an end wall and opposing side walls extending from the end wall. The end wall includes a first opening wall that at least partially defines a first opening for receiving the associated jounce tongue and supporting the first bracket thereon in spaced relation to at least one of the associated unsprung mass or the associated sprung mass. The second bracket engages the first bracket and includes a top wall for receiving the associated air spring assembly and opposing side walls extending from the top wall.

One exemplary embodiment of a supplemental suspension system in accordance with the present novel concept for use on an associated vehicle is provided. The associated vehicle includes associated sprung and unsprung masses and an associated primary suspension system that is operatively connected between the associated sprung and unsprung masses. The associated primary suspension system includes an associated non-fluid spring and an associated jounce tongue that is supported along one of the associated sprung mass and the associated unsprung mass adjacent the associated non-fluid spring. The supplemental suspension system includes an air spring assembly and a mounting bracket assembly. The air spring assembly includes a first end member operatively connected on one of the associated sprung mass and the associated unsprung mass. A second end member is spaced from the first end member and is disposed toward the other of the associated sprung mass and the associated unsprung mass. A flexible wall is secured therebetween and at least partially defines a spring chamber. The mounting bracket assembly is supported on the associated jounce tongue and is spaced from the other of the other of the associated sprung mass and the associated sprung mass and the associated unsprung mass. The mounting bracket assembly includes a top wall and an end wall. The top wall receives the second end member of the air spring assembly. The end wall includes an opening dimensioned to receive the associated jounce tongue and support the mounting bracket assembly thereon.

One exemplary embodiment of a supplemental suspension system kit in accordance with the present novel concept for use on an associated vehicle is provided. The associated vehicle includes associated sprung and unsprung masses and an associated primary suspension system operatively connected between the associated sprung and unsprung masses. The associated primary suspension system includes an associated non-fluid spring and an associated jounce tongue supported along one of the associated sprung and associated unsprung masses adjacent the associated non-fluid spring. The supplemental suspension system kit includes an air spring assembly, a first bracket and a second bracket. The air spring assembly includes a first end member capable of being operatively connected on one of the associated sprung mass of the associated unsprung mass, a second end member spaced from said first end member toward the other of the associated sprung mass and the associated unsprung mass, and a flexible wall secured therebetween that at least partially defines a spring chamber. The first bracket includes a top wall and a rear wall with the top wall being capable of receiving the second end member of the air spring assembly. The second bracket is capable of being connected to the first bracket and includes an end wall that includes an opening for receiving the associated jounce tongue. The second bracket is capable of being supported on the associated jounce tongue in spaced relation to the other of the associated sprung mass and the associated unsprung mass.

DETAILED DESCRIPTION

Figure 1:
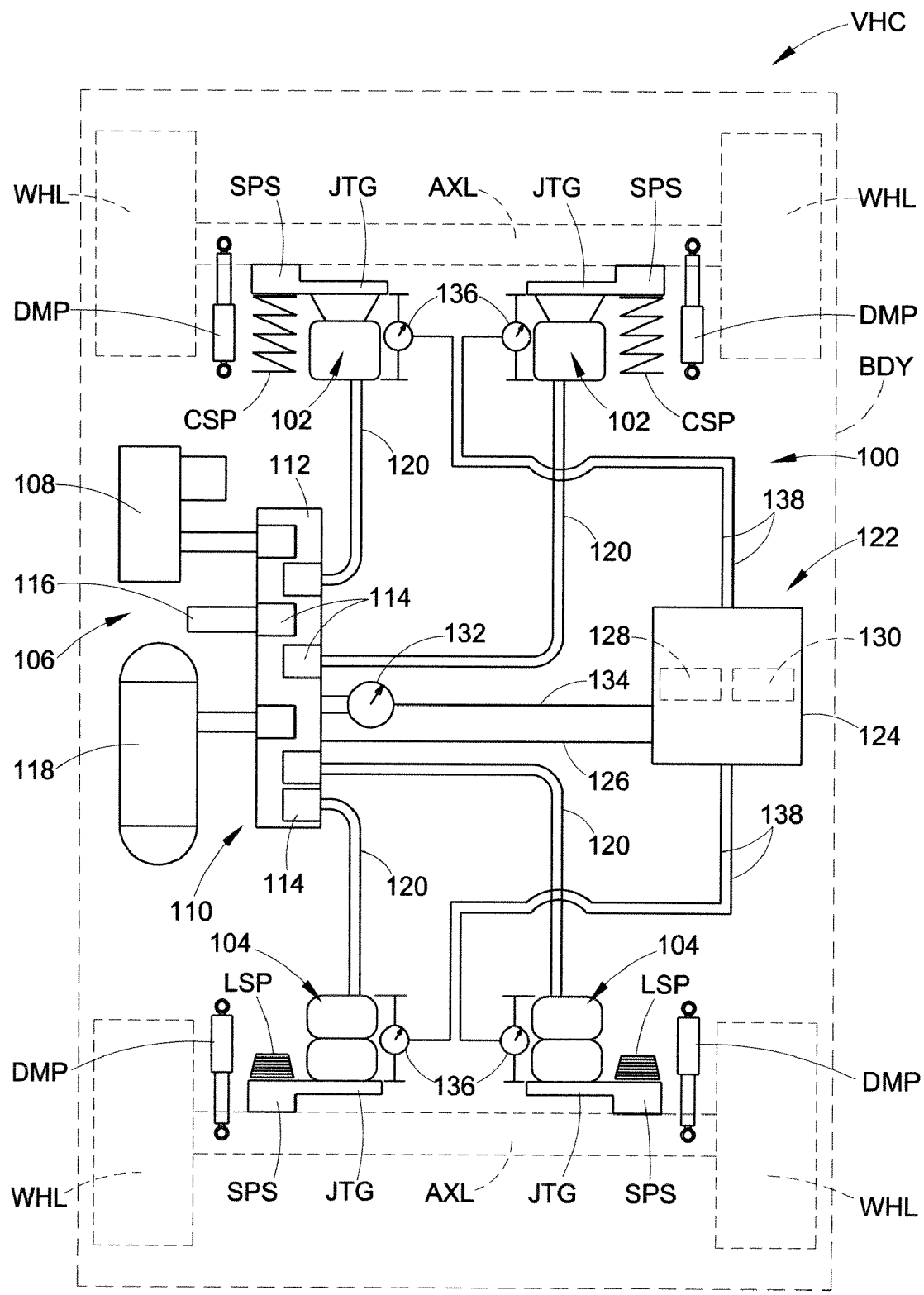
FIG. 1 is a schematic representation of one example of a supplemental suspension system in accordance with the present novel concept shown on an associated vehicle.

Turning now to the drawings wherein the showings are for the purpose of illustrating exemplary embodiments of the present novel concept and not for the purpose of limiting the same, FIG. 1 illustrates one embodiment of a primary suspension system (not numbered) disposed between a sprung mass, such as an associated vehicle body BDY and/or an associated vehicle frame FRM (FIG. 2), for example, and an unsprung mass, such as an associated wheel WHL or an associated AXL, for example of an associated vehicle VHC. The primary suspension system can be operatively connected between the sprung and unsprung masses of the associated vehicle in any suitable manner, and can include non-fluid springs of any suitable type, kind and/or configuration, such as coil springs CSP, leaf springs LSP, and/or torsion springs (not shown), for example.

The non-fluid springs, regardless of type, kind and/or configuration, are preferably supported on spring seats SPS, which can be disposed on or along the vehicle in any suitable manner, such as being supported on the sprung mass or the unsprung mass, for example. Furthermore, one or more of the spring seats preferably includes an existing jounce tongue JTG extending therefrom, such as may be suitable for engaging a jounce bumper (not shown), for example. The primary suspension system of the vehicle can also optionally include a plurality of damping members, such as dampers DMP, for example.

One exemplary embodiment of a supplemental suspension system 100 is shown in FIG. 1 as being operatively associated with vehicle VHC and is operatively disposed between the sprung and unsprung masses thereof. Supplemental suspension system 100 includes a plurality of fluid spring assemblies, such as air springs 102 and/or 104, for example. It will be appreciated that the fluid spring assemblies can be of any suitable type, kind and/or configuration, and that the rolling lobe-type and convoluted bellows-type air springs shown and described herein are merely exemplary.

Supplemental suspension system 100 also includes a pressurized fluid supply system 106 operatively associated with the fluid spring assemblies for selectively supplying pressurized fluid thereto and selectively transferring pressurized fluid therefrom. In the exemplary embodiment shown in FIG. 1, fluid supply system 106 includes a pressurized fluid source, such as a compressor 108, for example, for generating pressurized air or other fluids. A valve assembly 110 is shown as being in communication with compressor 108 and can be of any suitable configuration or arrangement. In the exemplary embodiment shown, valve assembly 110 includes a valve block 112 with a plurality of valves (not shown) supported on the valve block 112 with corresponding valve actuators 114 operatively connected thereto for selectively opening and closing the valves. Valve assembly 110 can also include a suitable exhaust, such as a muffler 116, for example, for venting pressurized fluid from the system. Optionally, pressurized fluid supply system 106 can also include a reservoir 118 in fluid communication with valve assembly 110 and suitable for storing pressurized fluid.

Valve assembly 110 is in communication with air springs 102 and/or 104 through fluid transmission lines 120. As such, pressurized fluid can be selectively transmitted to and/or from the air springs through valve assembly 110, such as to alter or maintain vehicle height at one or more corners of the vehicle, for example.

Supplemental suspension system 100 also includes a control system 122 in communication with various other systems and/or components of supplemental suspension system 100 for selective operation and control thereof. Control system 122 includes a controller or electronic control unit 124 in communication with compressor 108 and/or valve assembly 110, such as through a conductor or lead 126, for example, for selective operation and control thereof, including supplying and exhausting pressurized fluid to and from air springs 102 and/or 104. Controller 124 can be of any suitable type, kind and/or configuration, and can optionally include any suitable systems and/or components, such as a processing device 128 and/or a memory 130, for example. Processing device 128 can be a microprocessor, microcontroller or microcomputer, for example. Memory 130 can be, for example, a volatile or non-volatile memory.

One or more pressure sensors, can optionally be provided and can be in communication with controller 124 in any suitable manner. In the exemplary embodiment shown in FIG. 1, a pressure sensor 132 is disposed in operative association with valve assembly 110. By selectively opening and closing the valves of valve block assembly 110, the pressure in reservoir 118 and/or individual air springs 102 and/or 104 can be determined, as will be understood by those of skill in the art. The pressure sensor generates pressure signals having a relation to a fluid pressure associated with the fluid supply system and/or the fluid spring devices, and such pressure signals can be communicated to controller 124 in any suitable manner, such as through conductor or lead 134, for example. Additionally, height sensors 136 can be operatively associated with air springs 102 and/or 104 for outputting signals indicative of a height of the air springs or the distance between components of the vehicle. Height sensors 136 are in communication with controller 124, which receives the height or distance signals therefrom. The height sensors can be in communication with controller 124 in any suitable manner, such as through conductor or lead 138, for example. It will be appreciated that height sensors 136 can be of any suitable type, kind or construction, such as mechanical linkage sensors, ultrasonic sensors and/or electromagnetic sensors, for example.

Figure 2:
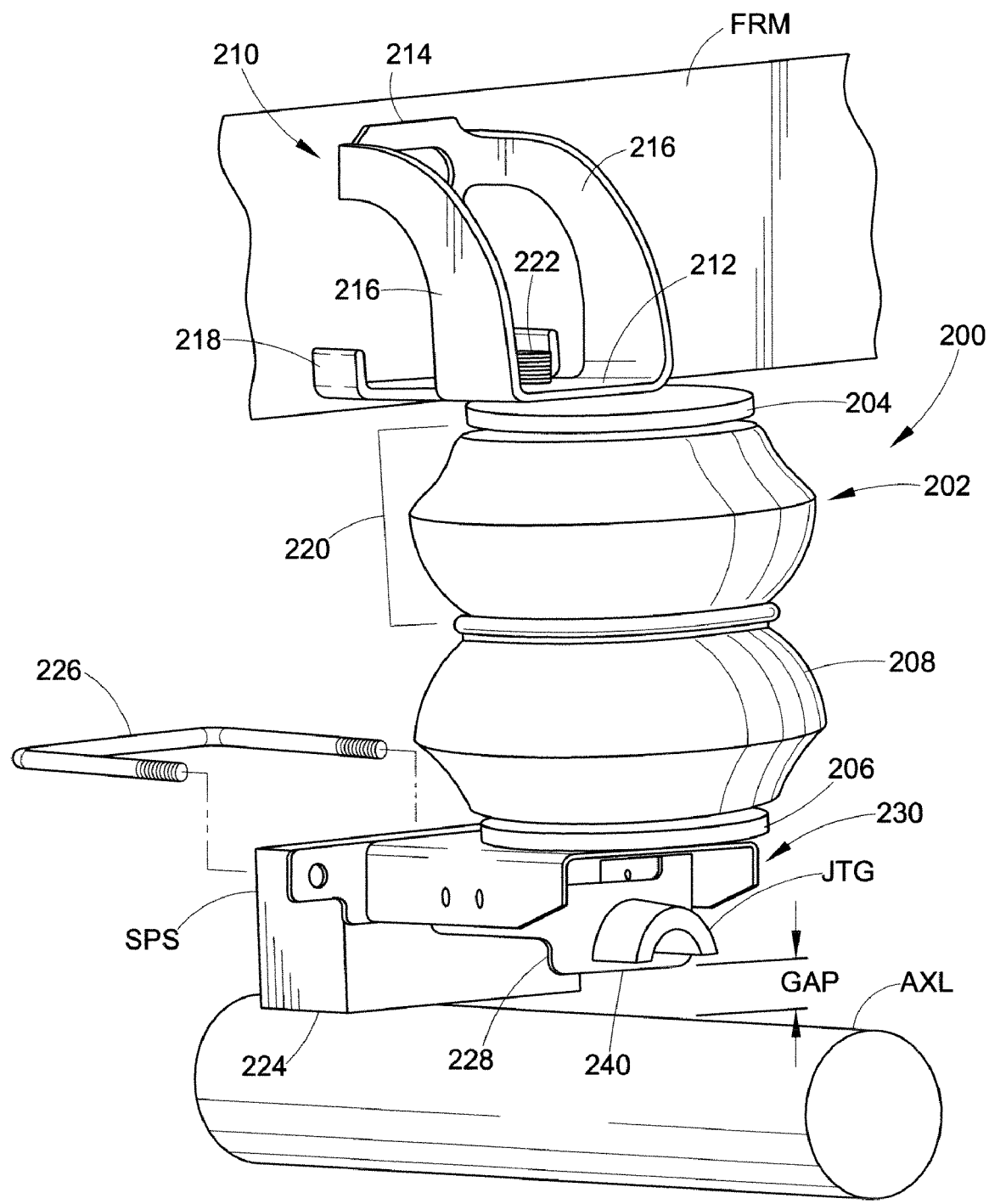
FIG. 2 is a perspective view of one exemplary embodiment of a supplemental suspension system including a mounting bracket assembly.
Figure 3:
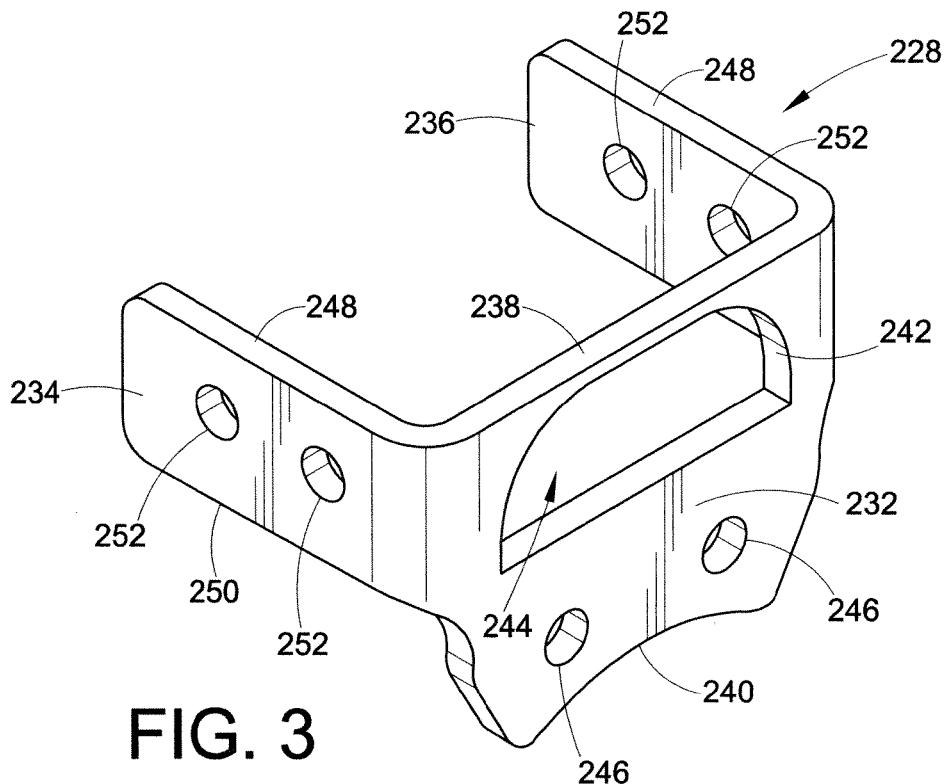
FIG. 3 is a bottom perspective view of one exemplary embodiment of a first bracket of the mounting bracket assembly shown in FIG. 2.
Figure 4:
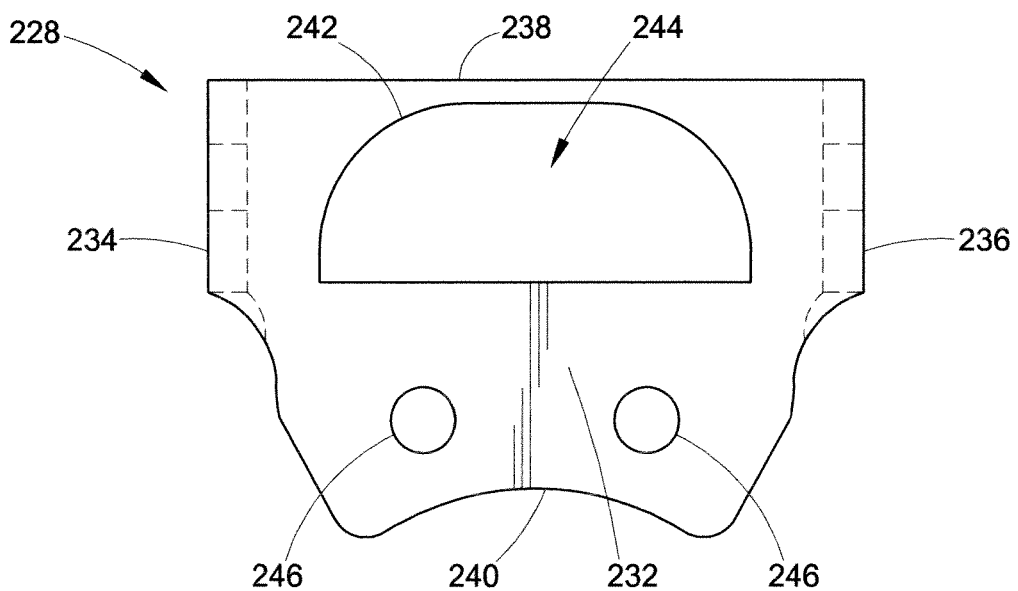
FIG. 4 is an end view of the first bracket of FIG. 3.

As discussed above, the fluid spring assemblies of supplemental suspension system 100, such as air springs 102 and/or 104, for example, are operatively connected between the sprung and unsprung masses of the associated vehicle. It will be appreciated that the fluid spring assemblies can be secured on the associated vehicle in any suitable manner. For example, a supplemental suspension system 200 is shown in FIG. 2 as including an exemplary fluid spring assembly 202, such as one of air spring assemblies 102 or 104, for example, secured between an unsprung mass, such as axle AXL, for example, and a sprung mass, such as frame FRM, for example, of the associated vehicle. However, it will be appreciated that any other arrangement could alternately be used, such as providing the spring seat along the sprung mass, for example.

Spring seat SPS, which is suitable for receiving a non-fluid spring (not shown in FIG. 2), is secured on the unsprung mass, such as on or along axle AXL as shown in FIG. 2, for example. The spring seat can be operatively connected to the axle or another vehicle component in any suitable manner, such as by using one or more mechanical fasteners and/or using a flowed-material joint (e.g., a braze or weld joint), for example. Additionally, jounce tongue JTG projects from spring seat SPS in spaced relation to axle AXL, and is originally provided to engage a suitable bumper (not shown) during a jounce motion.

As indicated above, fluid spring assembly 202 can be of any suitable type, kind and/or configuration, and generally includes a first end member 204, a second end member 206 spaced from the first end member, and a flexible wall 208 that is secured therebetween and at least partially defines a spring chamber (not shown). Additionally, it will be appreciated that fluid spring assembly 202 can be disposed between the associated sprung and unsprung masses of the associated vehicle. For example, first end member 204 can be operatively connected to the associated sprung mass with second end member 206 disposed toward the associated unsprung mass. As shown in FIG. 2, first end member 204 can be disposed toward associated vehicle frame FRM or another structural component and can be secured thereto or otherwise supported thereon in any suitable manner. For example, supplemental suspension system 200 can include a suitable securement bracket, such as an upper or frame bracket 210, for example, operatively connecting first end member 204 with, in the embodiment illustrated in FIG. 2, associated vehicle frame FRM. It will be appreciated that the securement bracket can be of any suitable configuration and/or construction. In the exemplary embodiment shown, frame bracket 210 includes a first or bottom wall 212 and a second or upper wall 214 that is spaced from the bottom wall and disposed approximately transverse thereto. Support or gusset walls 216 extend between the first and second walls and can be secured therebetween in any suitable manner. For example, the frame bracket could be integrally formed from a unitary piece or sheet of material or fabricated as a weldment from two or more pieces of material and/or components. Additionally, projections 218 suitable for engaging a structural component, such as associated frame FRM, for example, can optionally be provided on or along bottom wall 212.

Furthermore, supplemental suspension system 200 can also optionally include a heat shield 220 or other protective device disposed on or along fluid spring assembly 202. Additionally, a fluid passage (not shown) in fluid communication with the spring chamber can be formed through any suitable wall or walls of the fluid spring assembly, such as through a fitting 222 extending through first end member 204, for example.

Supplemental suspension system 200 also includes a mounting bracket assembly 224 that is supported on associated jounce tongue JTG and spaced from the unsprung mass as indicated by gap GAP in FIG. 2. Mounting bracket assembly 224 can be retained on associated jounce tongue JTG in any suitable manner. For example, the mounting bracket assembly could be received on the associated jounce tongue using a friction fit suitable for retaining the mounting bracket assembly. As another example, a pin or fastener (not shown) could be secured through a passage (not shown) extending through the jounce tongue. As still another example, supplemental suspension system 200 can optionally include a clamping device, such as a bail clamp 226, for example, that can extend at least partially around a structural component, such as spring seat SPS, for example, and secure mounting bracket assembly 224 on the associated jounce tongue.

Additionally, mounting bracket assembly 224 can be of any suitable type, kind, configuration and/or construction that is suitable for securing a fluid spring assembly on an associated jounce tongue, such as jounce tongue JTG, for example. For example, the mounting bracket assembly could be formed as a single bracket, such as from a unitary sheet or piece of material, for example. Alternately, the mounting bracket assembly can be formed from two or more brackets and/or other parts or components. Additionally, it will be appreciated that such two or more components can be secured together in any suitable manner. For example, two or more brackets could be secured together using flowed-material joints (e.g., welded joints, brazed joints) to form a single assembly.

As shown in FIG. 2, mounting bracket assembly 224 includes two separable mounting brackets, such as a first bracket 228 and a second bracket 230, for example. As discussed above, however, any other suitable construction and/or arrangement could alternately be used. In the exemplary embodiment shown, first bracket 228 is supported on associated jounce tongue JTG and second bracket 230 is supported on the first bracket. Thus, fluid spring assembly 202 can be operatively connected to the associated unsprung mass by securing second end member 206 on the mounting bracket assembly, such as on or along second bracket 230, for example.

As can be more clearly seen in FIGS. 3-6, first bracket 228 includes an end wall 232 and side walls 234 and 236 extending from end wall 232. It will be appreciated that end wall 232 can be of any suitable size, shape and/or configuration and generally extends between a top edge 238 and a bottom edge 240. As shown in use in FIG. 2, first bracket 228 is supported on associated jounce tongue JTG such that bottom edge 240 is spaced a distance from axle AXL, as indicted by dimension GAP. Additionally, end wall 232 includes an opening wall 242 that at least partially forms an opening 244 through end wall 232. One or more other holes or openings, such as holes 246, for example, can optionally be provided through end wall 232, such as may be suitable for receiving a fastener (not shown) for securement on or along the associated spring seat or jounce tongue, for example.

Figure 5:
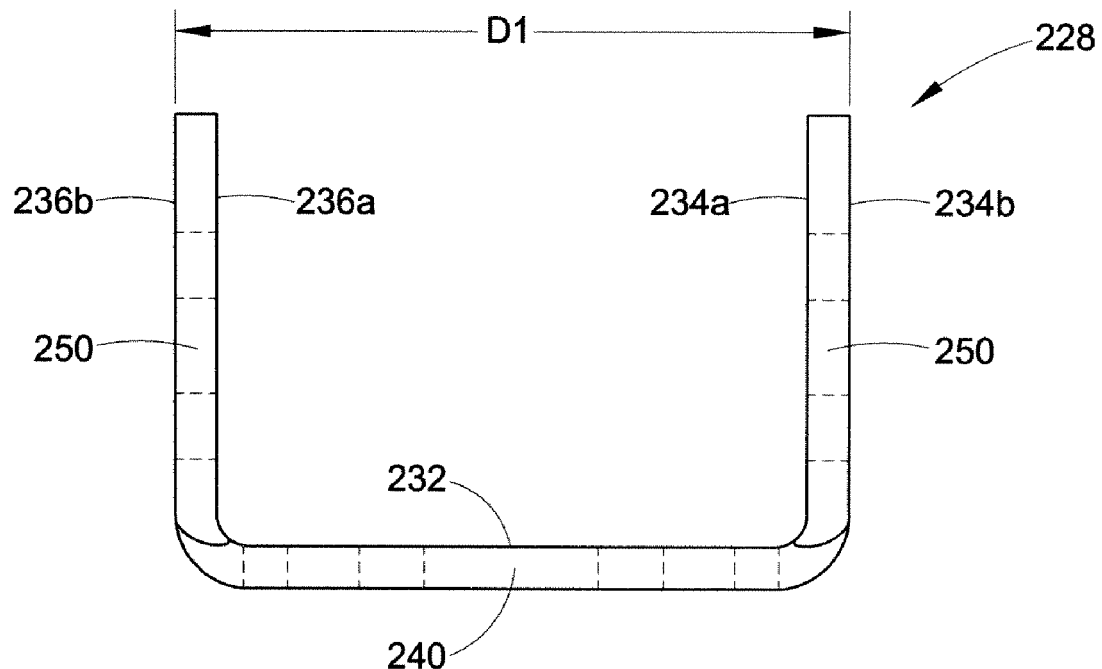
FIG. 5 is a bottom view of the first bracket of FIG. 3.
Figure 6:
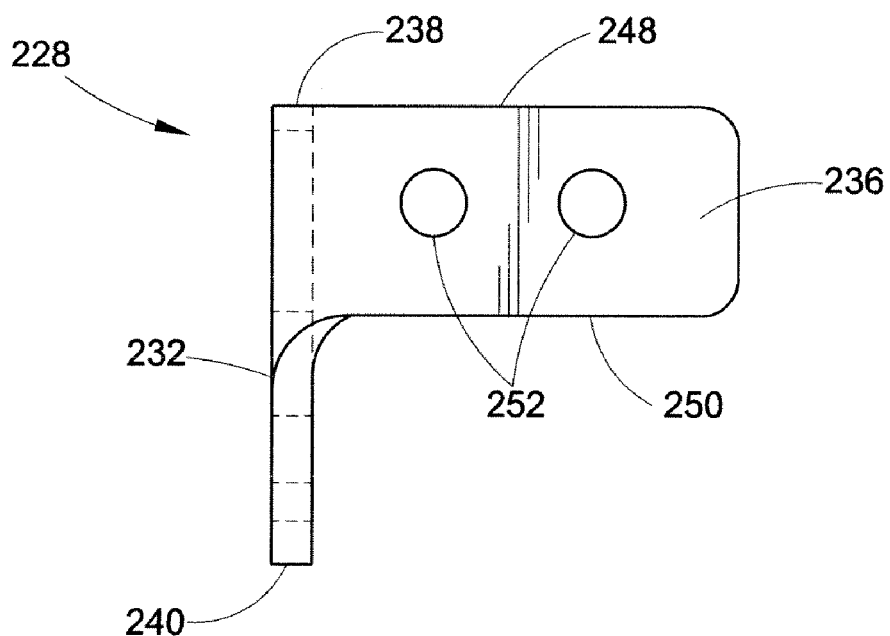
FIG. 6 is a side view of the first bracket of FIG. 3.
Figure 7:
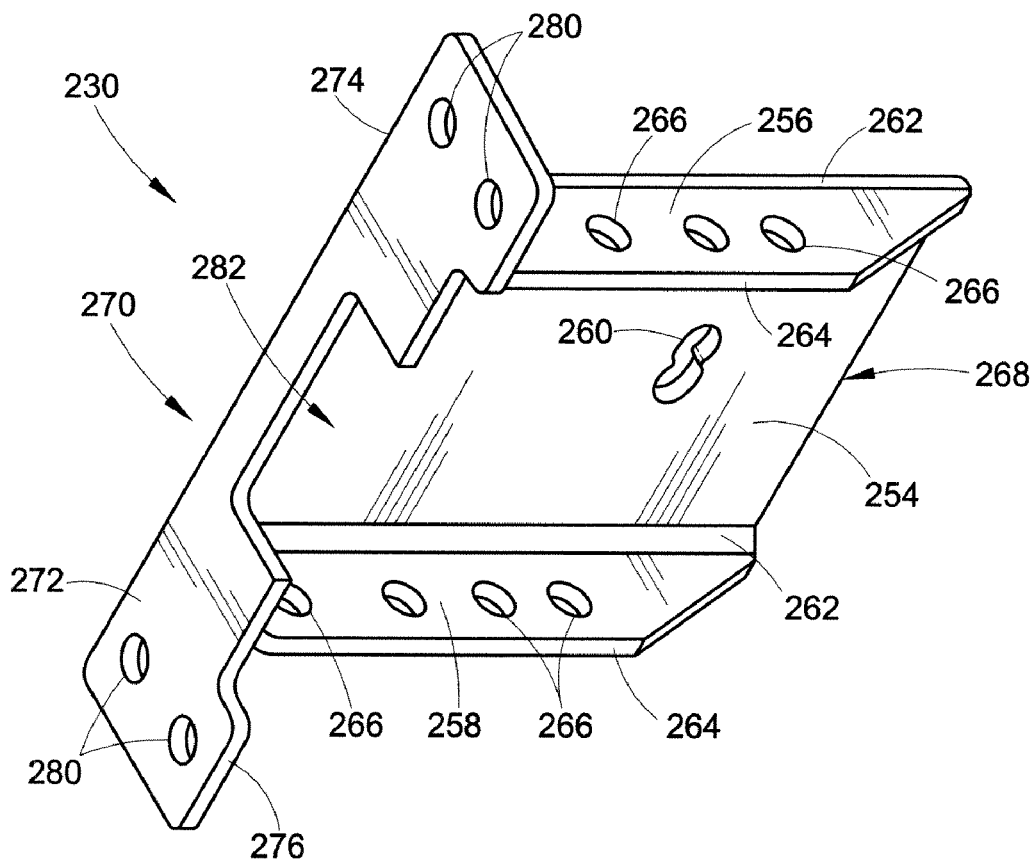
FIG. 7 is a bottom perspective view of one exemplary embodiment of a second bracket of the mounting bracket assembly in FIG. 2.
Figure 8:
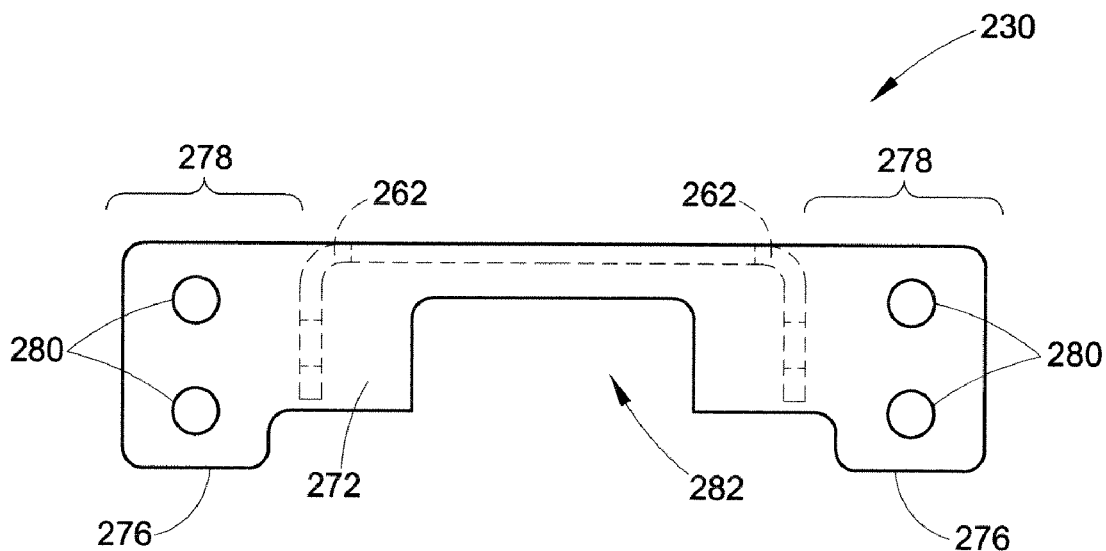
FIG. 8 is an end view of the second bracket of FIG. 7.

Side walls 234 and 236 extend from end wall 232 and include inner surfaces, which are designated in FIG. 5 by item numbers 234a and 236a, and outer surfaces, which are designated in FIG. 5 by item numbers 234b and 236b. Side walls 234 and 236 are spaced from one another, as indicated by dimension D1 in FIG. 5 extending between outer surfaces 234b and 236b. Side walls 234 and 236 are shown as extending from end wall 232 in approximate alignment with one another and in approximate transverse relation to the end wall. However, it will be appreciated that any other suitable construction and/or arrangement could alternately be used. Additionally, side walls 234 and 236 extend between top and bottom edges 248 and 250. In the exemplary embodiment shown, top edges 248 are in approximate alignment with top edge 238 of end wall 232. However, any other suitable arrangement can alternately be used. Furthermore, one or more openings can be provided through the side walls, such as mounting holes 252, for example.

Second bracket 230 is shown in additional detail in FIGS. 7-10 and includes a top wall 254 and side walls 256 and 258 that extend from top wall 254. An opening 260 of any size, shape and/or configuration can optionally extend through top wall 254, such as for receiving a securement device to operatively connect second end member 206 on or along the top wall, for example. Top wall 254 is shown as being approximately planar. However, it will be appreciated that any suitable shape or configuration could alternately be used.

Figure 9:
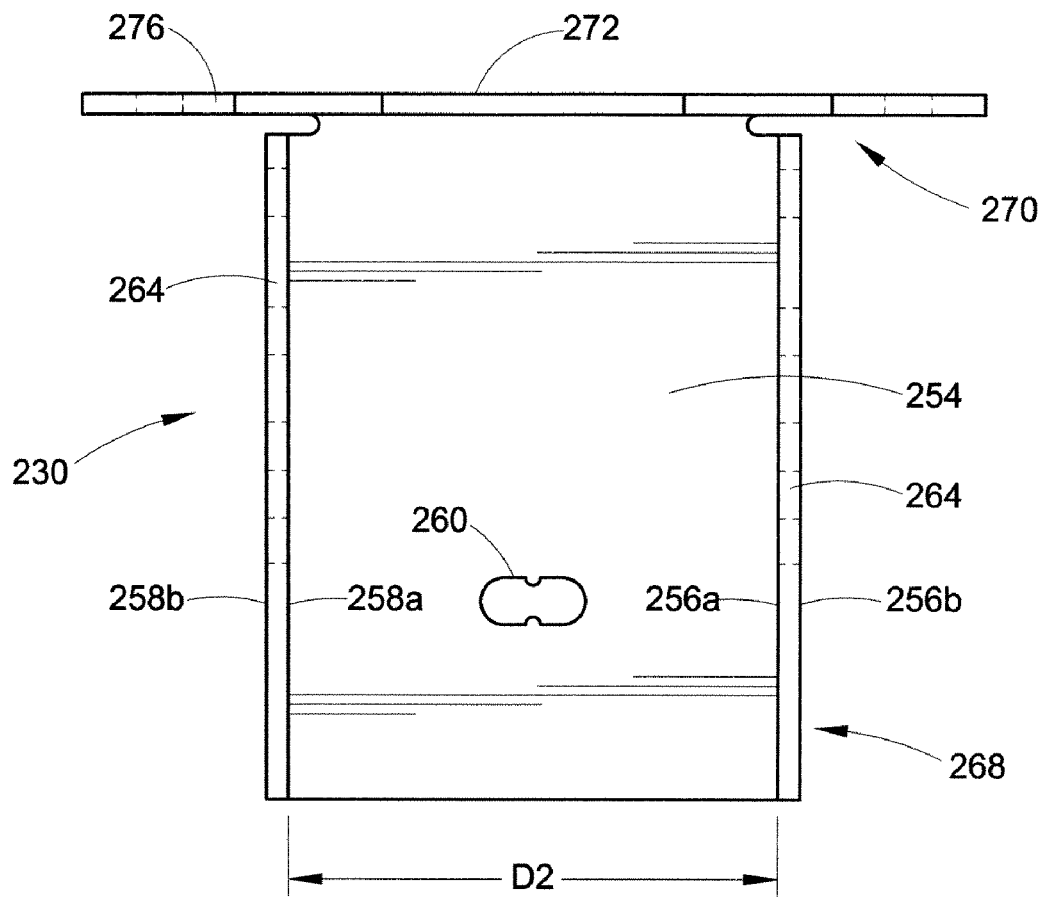
FIG. 9 is a bottom view of the second bracket of FIG. 7.
Figure 10:
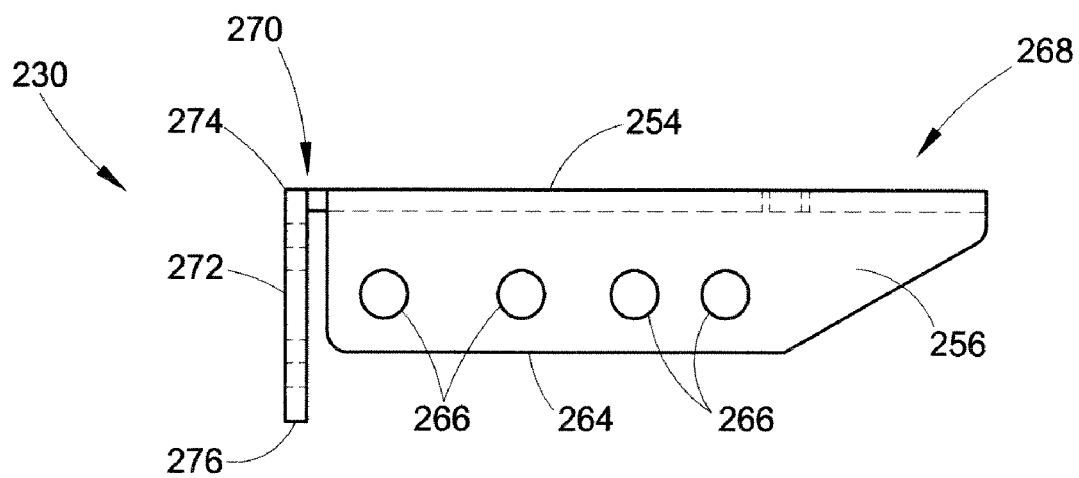
FIG. 10 is a side view of the second bracket of FIG. 7.

Side walls 256 and 258 extend from top wall 254 and include inner surfaces, which as indicated in FIG. 9 by item numbers 256*a* and 258*a*, and outer surfaces, which are indicated in FIG. 9 by item numbers 256*b* and 258*b*. Side walls 256 and 258 are disposed in spaced relation to one another, as indicated by dimension D2 in FIG. 9 extending between inner surfaces 256*a* and 258*a*. Side walls 256 and 258 are shown as being integrally formed with top wall 254. As such, the top wall and side wall include commonly formed intermediate wall portions 262 with side walls 256 and 258 extending to lower edges 264. Side walls 256 and 258 are shown as being in approximate alignment with one another and in approximate transverse relation to the top wall. However, it will be appreciated that any suitable arrangement and/or orientation could alternately be used. Additionally, one or more openings can be provided through side walls 256 and 258, such as mounting holes 266, for example.

Top wall 254 and side walls 256 and 258 form a channel-shaped portion of second bracket 230, which extends between a front end 268 and a rear end 270. A rear wall 272 is disposed along rear end 270 and extends approximately transverse to top wall 254 as well as side walls 256 and 258. In the exemplary embodiment shown, rear wall 272 includes a top edge 274 in approximate alignment with top wall 254, and a bottom edge 276 spaced from the top edge beyond lower edges 264 of the side walls. Additionally, rear wall 272 includes extension portions 278 that project outwardly beyond side walls 256 and 258. One or more openings, such as mounting holes 280, for example, extend through the extension portions and can be suitable for receiving a securement device, such as bail clamp 226, for example. Additionally, one or more reliefs or notches 282 can optionally be formed along rear wall 272, such as for providing clearance for associated jounce tongue JTG, for example. It will be appreciated that rear wall 272 can be supported on and/or along rear end 270 in any suitable manner, such as by being integrally formed with top wall 254 or by being formed as a separate component and attached to the rear end using a flowed-material joint (e.g., a weld), for example.

In the exemplary embodiment shown, first bracket 228 is supported on associated jounce tongue JTG. Second bracket 230 is supported on first bracket 228 such that side walls 234 and 236 thereof are received between side walls 256 and 258 of the second bracket with outer surfaces 234*b* and 236*b* disposed adjacent inner surfaces 256*a* and 258*a*. Additionally, second bracket 230 can be positioned on and/or along first bracket 228 in any suitable manner. For example, the second bracket can be positioned on the first bracket such that top edges 238 and/or 248 are in abutting engagement with top wall 254. As another example, the second bracket can be positioned on the first bracket such that one or more of holes 252 and 266 are in approximate alignment with one another. In such an arrangement, the first and second brackets can be secured together in any suitable manner, such as by using one or more fasteners (not shown) extending through two or more of the approximately aligned holes.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. A supplemental suspension system for use on an associated vehicle including associated sprung and unsprung masses and an associated primary suspension system operatively connected between the associated sprung and unsprung masses, the associated primary suspension system including an associated non-fluid spring and an associated jounce tongue supported along one of the associated sprung mass and the associated unsprung mass adjacent the associated non-fluid spring, said supplemental suspension system comprising:

an air spring assembly including a first end member operatively connected on one of the associated sprung mass and the associated unsprung mass, a second end member spaced from said first end member and disposed toward the other of the associated sprung mass and the associated unsprung mass, and a flexible wall secured therebetween and at least partially defining a spring chamber; and, a mounting bracket assembly supported on the associated jounce tongue and spaced from the other of the associated sprung mass and the associated unsprung mass, said mounting bracket assembly including a top wall and an end wall, said top wall receiving said second end member of said air spring assembly, and said end wall including an opening dimensioned to receive the associated jounce tongue and support said mounting bracket assembly thereon.

2. The supplemental suspension system of claim 1, wherein the associated sprung mass includes an associated vehicle frame, and said supplemental suspension system further comprises a frame bracket supported on the associated vehicle frame and including a bottom wall receiving said first end member of said air spring assembly.

3. The supplemental suspension system of claim 1, wherein said mounting bracket assembly includes a first mounting bracket and a second mounting bracket operatively engaging said first mounting bracket, said first mounting bracket including said end wall and said opening for receiving the associated jounce tongue, and said second mounting bracket including said top wall receiving said second end member of said air spring assembly.

4. The supplemental suspension system of claim 3, wherein said second bracket includes spaced side walls extending from said top wall and a rear wall extending between said side walls in approximately transverse relation to said top wall.

5. The supplemental suspension system of claim 4, wherein said rear wall includes opposing extended wall portions extending outwardly beyond said side walls, and said supplemental suspension system further comprises a clamping member engaging said extended wall portions and operatively connecting at least said second bracket along the associated primary suspension system.

6. The supplemental suspension system of claim 1 further comprising a pressurized fluid source in communication with said air spring assembly and a controller operative to selectively energize said pressurized fluid source.

7. A supplemental suspension system kit for use on an associated vehicle including associated sprung and unsprung masses and an associated primary suspension system operatively connected between the associated sprung and unsprung masses, the associated primary suspension system including an associated non-fluid spring and an associated jounce tongue supported along one of the associated sprung mass and the associated unsprung mass adjacent the associated non-fluid spring, said kit comprising:

an air spring assembly including a first end member capable of being operatively connected on one of the associated sprung mass and the associated unsprung mass, a second end member spaced from said first end member toward the other of the associated sprung mass and the associated unsprung mass, and a flexible wall secured therebetween and at least partially defining a spring chamber;

a first bracket including a top wall and a rear wall, said top wall capable of receiving said second end member of said air spring assembly; and, a second bracket capable of being connected to said first bracket and including an end wall, said end wall including an opening capable of receiving the associated jounce tongue and of being supported on the associated jounce tongue in spaced relation to the other of the associated sprung mass and the associated unsprung mass.

8. A supplemental suspension system kit according to claim 7 further comprising a frame bracket including an upper mounting portion capable of securement on the associated sprung mass and a bottom wall spaced from said upper mounting portion and capable of engaging said first end member of said air spring assembly.

9. A supplemental suspension system kit according to claim 8 further comprising a bail clamp capable of operatively connecting the associated non-fluid spring and said first bracket.

* * * * *

UNITED STATES PATENT AND TRADEMARK OFFICE
CERTIFICATE OF CORRECTION

PATENT NO.      : 7,614,630 B2                                          Page 1 of 1
APPLICATION NO. : 11/493307
DATED           : November 10, 2009
INVENTOR(S)     : James Richard Myers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Nineteenth Day of October, 2010

David J. Kappos
*Director of the United States Patent and Trademark Office*